(No Model.)
P. PRADO.
PHOTO MICROGRAPHIC CAMERA.
No. 274,515. Patented Mar. 27, 1883.
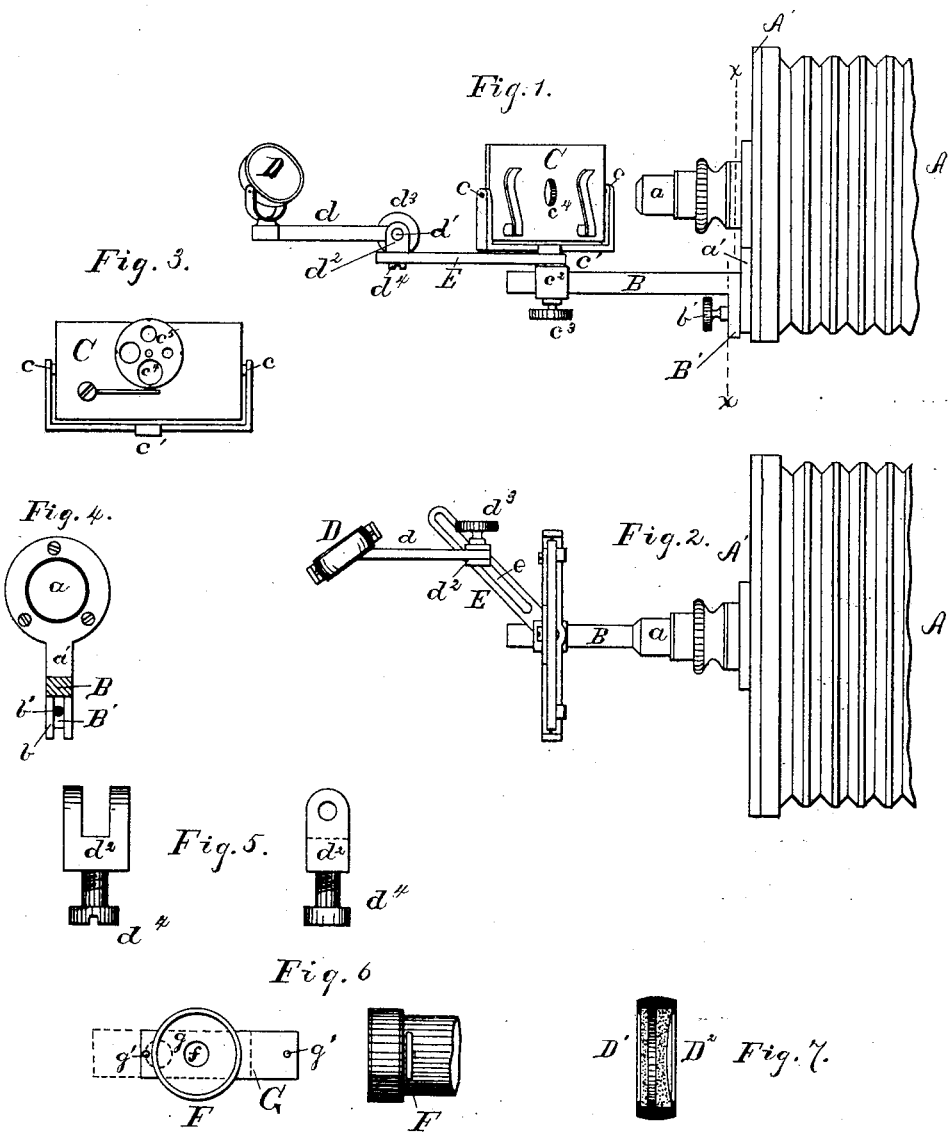
Witnesses
E. A. Dick
J. Walter Blandford.
Inventor
Philip Prado
by Brashears & Williams
Attorneys

UNITED STATES PATENT OFFICE.

PHILIP PRADO, OF BALTIMORE, MARYLAND.

PHOTO-MICROGRAPHIC CAMERA.

SPECIFICATION forming part of Letters Patent No. 274,515, dated March 27, 1883.

Application filed October 18, 1882. (No model.)

*To all whom it may concern:*

Be it known that I, PHILIP PRADO, a citizen of the United States, residing at Baltimore, Maryland, have invented new and useful Improvements in Photo-Micrographic Cameras, of which the following is a specification, reference being had to the accompanying drawings, in which—

Figure 1 is a side elevation, the stage and mirror being turned at an angle. Fig. 2 is a top plan view. Fig. 3 is an elevation of the stage. Fig 4 is a section on line $x\ x$ of Fig. 1, and Figs. 5, 6, and 7 are detail views.

Like letters of reference mark the same parts in all the figures.

A represents an ordinary camera, the only requirement being that the ground glass upon which the image is thrown must be at least twelve inches from the lens.

$a$ is the lens, mounted on the front A' of the camera by screws, as shown in Fig. 4, and having a downward-projecting arm, $a'$.

B is an arm, which may be of any desired form in section, upon which are adjustably mounted the stage C and reflecting-mirror D. This arm has a downward-projecting portion, B', which has in it a slot, $b$, (see Fig. 4,) through which passes a set-screw, $b'$, by which the arm B is adjustably secured to the camera.

The stage C is horizontally and vertically pivoted at $c\ c'$ to a slide, $c^2$, which may be adjusted forward and secured in any position by the set-screw $c^3$. This stage C is provided with spring-clamps to hold the object-glass, a central opening to allow the light to pass through, and a rotating plate, $c^5$, having a series of holes of graduated size, any of which may be brought to coincide with the opening $c^4$, and thus contract said opening as desired.

The reflecting-mirror D has a plane face, D', and a concave face, $D^2$, (see Fig. 7,) and is horizontally and vertically pivoted on the outer end of a bar, $d$, which is pivoted horizontally at $d'$ in a nut, $d^2$. (See Figs. 1, 2, and 5.) It is thus adjustable in vertical planes, and is held as thus adjusted by a set-screw, $d^3$. The nut $d^2$ is also adjustable horizontally on a bar, E, and is held in its adjusted position by means of a screw, $d^4$, passing upward through a slot, $e$, in lever E, (see Fig. 2,) and into said nut, as shown in Fig. 5.

F (see Fig. 6) is a cap to fit over the lens $a$, and has an opening, $f$, coinciding with the lens, through which the rays of light pass into the camera. This cap is provided with a slide, G, having an opening, $g$, and pins $g'$ to limit its motion. When this slide is moved to the right, as shown by full lines, the openings $f$ and $g$ will coincide, and the rays of light be allowed to pass through the lens into the camera. When it is moved to the left, as seen in dotted lines, the light will be shut out.

When it is desired to photograph an object microscopical in size the said object is placed upon a transparent plate, (usually glass,) and mounted on the stage by the spring-clasps in such a position as to appear through the opening $c^4$ in the stage. Should it be necessary to adjust the stage to bring the opening in correct alignment with the lens, the slide $c^2$ is moved on the bar B until the stage is in contact with the lens. The screw $b'$ is loosened, the stage adjusted with the opening directly opposite the lens, and the stage is now adjusted to a proper distance from the lens to throw a clear, sharp image on the ground glass in the camera. The mirror D is now adjusted to throw concentrated rays or diffused rays, as may be desired, upon the object on the stage, the concave surface being used in the former and the plane surface in the latter instance. The camera is now ready to receive the prepared plate, which is manipulated in the manner usual with photographers, any desired plate being used.

When it is desired to photograph an opaque object the stage C is removed and a silvered plate substituted, upon which the object is placed. In this case the mirror is swung around between the camera-box and the stage, so as to reflect the light upon rather than through the object.

The simplicity and cheapness as well as effectiveness of my invention will be apparent at a glance. The stage, it will be seen, is adjustable vertically by means of the slotted projection B' on bar B and set-screw $b'$, horizontally to and from the lens on the bar B, on the vertical axis $c'$, and on the horizontal axis $c$. The reflecting-mirror is adjustable on three vertical axes, horizontally in slot $e$, and on two horizontal axes. It will thus be seen that the lens and stage can be readily adjusted in line, and that the mirrors can be put into any conceivable position with relation to the object to be photographed, whether transparent or opaque.

Any light may be used, either direct, concentrated, or diffused, with good results.

Having thus fully described my invention, what I claim, and desire to secure by Letters Patent of the United States, is—

1. The combination, substantially as described, with the camera-box A, of the lens $a$, stage C, adjustable to and from the lens, and having vertical adjustment upon the camera-box, and also upon its vertical and horizontal axes, and the reflecting-mirror D, having universal adjustment, as set forth.

2. The combination, substantially as described, of the camera-box A, the lens $a$, having downward-projecting bar $a'$, the bar B, having downward-projecting slotted portion B', and the set-screw $b'$, as set forth.

3. The combination, substantially as described, with the camera-box and lens, of the bar E, pivoted upon a vertical axis at $c'$, and having slot $e$, the nut and screw $d^2$ $d^4$, the bar $d$, pivoted in the nut, and the mirror D, having adjustment upon three vertical and two horizontal axes, as set forth.

4. The combination, with the bar B, of the slide $c^2$, bar E, having slot $e$, nut and screw $d^2$ $d^4$, and bar $d$, carrying the reflecting-mirror, as set forth.

5. In combination with the camera-box and the universally-adjustable reflecting-mirror, the stage C, adjustable upon the bar B, both horizontally and vertically, and provided with an opening, $c^4$, and mounted upon horizontal and vertical axes.

6. A photo-micrographic instrument consisting of a camera-box provided with a single lens which projects the image upon the prepared plate, and at the same time magnifies it, a stage for holding the objective, having both vertical and horizontal adjustment relatively to said lens, and also adjustment upon its vertical and horizontal axes, and an adjustable reflector adapted to reflect light through or upon the objective, substantially as and for the purpose set forth.

In witness whereof I have subscribed my name.

PHILIP PRADO.

In presence of—
S. BRASHEARS,
JNO. T. MADDOX.